(12) United States Patent
McCawley et al.

(10) Patent No.: US 11,645,138 B2
(45) Date of Patent: May 9, 2023

(54) DIAGNOSING AND RESOLVING TECHNICAL ISSUES

(71) Applicant: INTERNATIONAL BUSINESS MACHINES CORPORATION, Armonk, NY (US)

(72) Inventors: Michael McCawley, Groton, MA (US); Robert E. Loredo, North Miami Beach, FL (US); Lily Ryzebol, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 16/918,097

(22) Filed: Jul. 1, 2020

(65) Prior Publication Data
US 2022/0004479 A1 Jan. 6, 2022

(51) Int. Cl.
| | |
|---|---|
| *G06F 11/00* | (2006.01) |
| *G06F 11/07* | (2006.01) |
| *G06F 11/34* | (2006.01) |
| *G06F 11/32* | (2006.01) |
| *G06F 9/54* | (2006.01) |
| *G06F 11/30* | (2006.01) |

(Continued)

(52) U.S. Cl.
CPC ............ *G06F 11/079* (2013.01); *G06F 9/542* (2013.01); *G06F 11/302* (2013.01); *G06F 11/324* (2013.01); *G06F 11/3471* (2013.01); *G06F 11/3476* (2013.01); *G06F 18/2148* (2023.01); *G06F 18/2185* (2023.01)

(58) Field of Classification Search
CPC ............... G06F 11/079; G06F 11/0793; G06F 11/0751; G06F 11/3452; G06F 11/3476; G06F 11/0766; G06F 11/3447; G06F 11/3636; G06F 11/0778; G06F 11/3466
See application file for complete search history.

(56) References Cited

U.S. PATENT DOCUMENTS

| | | | |
|---|---|---|---|
| 8,250,408 B1 * | 8/2012 | Cohen | ..................... H04L 43/08 714/48 |
| 9,697,104 B2 | 7/2017 | Obermiller | |
| 9,940,373 B2 | 4/2018 | Russell | |

(Continued)

FOREIGN PATENT DOCUMENTS

| | | |
|---|---|---|
| CN | 104239197 A | 12/2014 |
| CN | 107800591 A | 3/2018 |

(Continued)

OTHER PUBLICATIONS

Mell et al., "The NIST Definition of Cloud Computing", National Institute of Standards and Technology, Special Publication 800-145, Sep. 2011, pp. 1-7.

*Primary Examiner* — Charles Ehne
(74) *Attorney, Agent, or Firm* — Lily Neff

(57) ABSTRACT

The exemplary embodiments disclose a system and method, a computer program product, and a computer system for diagnosing technical issues. The exemplary embodiments may include collecting data relating to one or more technical issues, extracting one or more features from the collected data, determining one or more diagnoses based on the extracted one or more features and one or more models, and suggesting to a support agent one or more actions based on the one or more determined diagnoses.

20 Claims, 5 Drawing Sheets

(51) Int. Cl.
G06F 18/214 (2023.01)
G06F 18/21 (2023.01)

(56) References Cited

U.S. PATENT DOCUMENTS

| | | | |
|---|---|---|---|
| 10,127,139 | B2 | 11/2018 | O'Dowd |
| 11,269,718 | B1 * | 3/2022 | Chen .................. G06F 11/0709 |
| 2010/0318855 | A1 * | 12/2010 | Beg ..................... G06F 11/2257 |
| | | | 714/39 |
| 2014/0006861 | A1 * | 1/2014 | Jain ....................... G06N 20/00 |
| | | | 714/E11.178 |
| 2018/0268081 | A1 | 9/2018 | Kearney |
| 2018/0322283 | A1 | 11/2018 | Puri |
| 2021/0406112 | A1 * | 12/2021 | Moss .................. G06F 11/0793 |

FOREIGN PATENT DOCUMENTS

| | | |
|---|---|---|
| IN | 32972015 | 1/2017 |
| JP | 2007065718 A | 3/2007 |
| WO | 2017173969 A1 | 10/2017 |

\* cited by examiner

DIAGNOSING AND RESOLVING TECHNICAL ISSUES

BACKGROUND

The exemplary embodiments relate generally to technical support, and more particularly to diagnosing and resolving technical issues based on collected data.

Technical support agents must often perform analysis on computer log and trace files in order to resolve technical issues. This analysis is time consuming because computer log and trace files are large and complex. Additionally, issues in computer log and trace files may be difficult to spot, and it is often unclear where a technical support agent should focus their efforts in attempting to resolve an issue. Thus, log and trace analysis is a high-value activity that requires highly skilled engineers and consumes a lot of time, often producing unpredictable outcomes.

SUMMARY

The exemplary embodiments disclose a system and method, a computer program product, and a computer system for diagnosing technical issues. The exemplary embodiments may include collecting data relating to one or more technical issues, extracting one or more features from the collected data, determining one or more diagnoses based on the extracted one or more features and one or more models, and suggesting to a support agent one or more actions based on the one or more determined diagnoses.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
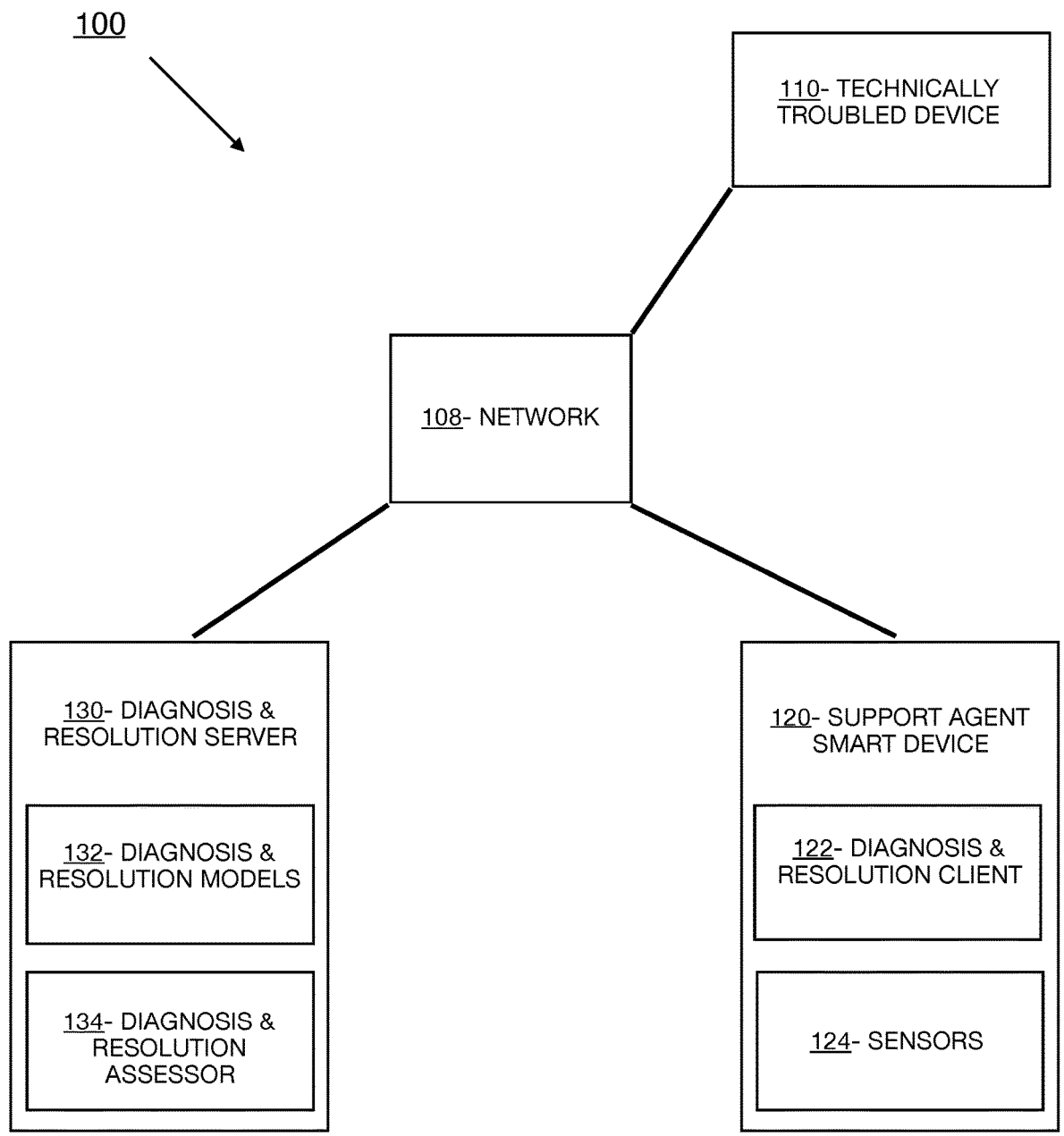
FIG. 1 depicts an exemplary schematic diagram of a diagnosis and resolution system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Technical support agents must often perform analysis on computer log and trace files in order to resolve technical issues. This analysis is time consuming because computer log and trace files are large and complex. Additionally, issues in computer log and trace files may be difficult to spot, and it is often unclear where a technical support agent should focus their efforts in attempting to resolve an issue. Thus, log and trace analysis is a high-value activity that requires highly skilled engineers and consumes a lot of time, often producing unpredictable outcomes.

Exemplary embodiments are directed to a method, computer program product, and computer system that will diagnose and resolve technical issues. In embodiments, machine learning may be used to create models capable of diagnosing and/or resolving technical issues, while feedback loops may improve upon such models. Moreover, data from sensors 124, computer logs, trace files, the internet, databases, log and trace viewer tools, etc. may be utilized to improve the determination of these characteristics. In embodiments, computer logs may include transaction logs, event logs, and/or message logs (internet relay chat, instant messaging, chatbot logs, transaction log analysis, etc.). In embodiments, trace files may include source code and various software tracing files. Various data including various computer logs and/or trace files may be utilized to diagnose and/or resolve different technical support diagnostic actions of different applications. In embodiments, examples of diagnoses may include misspellings, incorrect syntax, undefined variables, missing source code, missing software programs, unresponsive software programs, etc. In embodiments, examples of resolutions may include correcting misspelling, correcting syntax, defining variables, installing missing software, restarting device, etc., as well as resolutions such as notifying a support agent to "Please try reinstalling the program"

or "Please try restarting the device." In general, it will be appreciated that embodiments described herein may relate to aiding in the diagnosis and/or resolution of any technical issue.

FIG. 1 depicts the diagnosis and resolution system 100, in accordance with the exemplary embodiments. According to the exemplary embodiments, the diagnosis and resolution system 100 may include a technically troubled device 110, a support agent smart device 120, and a diagnosis and resolution server 130, which may be interconnected via a network 108. In embodiments depicted by FIG. 1, the technically troubled device 110 is a user device for which technical support is needed while the support agent smart device 120 is the device used by a support agent to troubleshoot the technically troubled device 110. In exemplary embodiments, the support agent has access to the technically troubled device 110 either locally, for example physically, or remotely, for example through remote desktop or screen sharing technology. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the diagnosis and resolution system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the technically troubled device 110 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. In embodiments, the technically troubled device 110 may be a user device for which support is needed and may include hardware and/or software for communicating with or providing remote access to a support agent, for example remote desktop technologies. In other embodiments, a support agent may have local access to the technically troubled device 110, for example physical access to the device. While the technically troubled device 110 is shown as a single device, in other embodiments, the technically troubled device 110 may be comprised of a cluster or plurality of computing devices, in a modular manner, etc., working together or working independently. The technically troubled device 110 is described in greater detail as a hardware implementation with reference to FIG. 3, as part of a cloud implementation with reference to FIG. 4, and/or as utilizing functional abstraction layers for processing with reference to FIG. 5.

In the example embodiment, the support agent smart device 120 includes a diagnosis and resolution client 122 and one or more sensors 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. In embodiments, the support agent smart device 120 may be a device used to provide troubleshooting support to a user having technical issues on the technically troubled device 110. Accordingly, the support agent smart device 120 may include software and/or hardware to communicate with a user and/or obtain remote access to the technically troubled device 110. In other embodiments, a support agent may have local access to the technically troubled device 110, for example physical access to the technically troubled device 110. While the support agent smart device 120 is shown as a single device, in other embodiments, the support agent smart device 120 may be comprised of a cluster or plurality of computing devices, in a modular manner, etc., working together or working independently. The support agent smart device 120 is described in greater detail as a hardware implementation with reference to FIG. 3, as part of a cloud implementation with reference to FIG. 4, and/or as utilizing functional abstraction layers for processing with reference to FIG. 5.

The diagnosis and resolution client 122 may be a software and/or hardware application capable of communicating with and providing a user interface for a support agent to interact with the diagnosis and resolution server 130 as well as the technically troubled device 110 via the network 108. The diagnosis and resolution client 122 may act as a client in a client-server relationship. Moreover, in the example embodiment, the diagnosis and resolution client 122 may be capable of transferring data between the support agent smart device 120 and other devices via the network 108, for example the technically troubled device 110 or a diagnosis and resolution server 130. In embodiments, the diagnosis and resolution assessor 134 utilizes various wired and wireless connection protocols for data transmission and exchange, including Bluetooth, 2.4 gHz and 5 gHz internet, near-field communication, Z-Wave, Zigbee, etc. The diagnosis and resolution client 122 is described in greater detail with respect to FIG. 2.

The sensors 124 are one or more hardware and/or software components of collecting data. While the sensors 124 are depicted as integrated with the support agent smart device 120, in embodiments, the sensors 124 may be additionally or alternatively integrated with the technically troubled device 110 and/or incorporated within an environment in which the diagnosis and resolution system 100 is implemented. For example, the sensors 124 may be one or more microphones/video cameras built into a computer, a mounted security camera, a log and trace viewer, and/or any sensors associated with a log and trace viewer, such as a keyboard, mouse, touchscreen, etc. In embodiments, a log and trace viewer and all associated sensors 124 such as a keyboard and mouse may be included as sensors 124.

Moreover, data processing techniques may be implemented such that directional information of visual and audio data can be obtained based on signals received by each of the sensors 124, such as trilateration and triangulation. In other embodiments, the sensors 124 may be integrated with other smart devices, e.g., smart phones and laptops, within an environment implementing the diagnosis and resolution system 100. In such embodiments, the sensors 124 may communicate directly with other networks and devices, such as the network 108. The sensors 124 are described in greater detail as a hardware implementation with reference to FIG. 3, as part of a cloud implementation with reference to FIG. 4, and/or as utilizing functional abstraction layers for processing with reference to FIG. 5.

In the exemplary embodiments, the diagnosis and resolution server 130 includes one or more diagnosis and resolution models 132 and a diagnosis and resolution assessor 134. The diagnosis and resolution server 130 may act as a server in a client-server relationship with the diagnosis and resolution client 122, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the diagnosis and resolution server 130 is shown as a single device, in other embodiments, the diagnosis and resolution server 130 may be comprised of a cluster or plurality of computing devices, working together or working independently. The diagnosis and resolution server 130 is described in greater detail as a hardware implementation with reference to FIG. 3, as part of a cloud implementation with reference to FIG. 4, and/or as utilizing functional abstraction layers for processing with reference to FIG. 5.

The diagnosis and resolution models 132 may be one or more algorithms modelling a correlation between one or more features and a diagnosis and resolution of a technical issue relating to a technically troubled device 110. The diagnosis and resolution models 132 may include a model for any type of technical issue experienced by the technically troubled device 110, and may be categorized based on, for example, a technical support ticket submission that includes a technical issue description/topic. The one or more features may include features relating to a support agent's interaction with computer log and trace files while troubleshooting a technical issue of the technically troubled device 110, such as where a support agent adds bookmarks, textual inputs, searches, annotations, highlighting, scrolling, mouse and keyboard selections, context, etc. The diagnosis and resolution models 132 may correlate the aforementioned features with a diagnosis for each type of technical issue categorized above, including misspellings, incorrect syntax, undefined variables, missing source code, missing software program, unresponsive software programs, unresponsive devices, etc. Moreover, the diagnosis and resolution models 132 may further associate a resolution with the aforementioned diagnosis, such as correcting misspelling, correcting syntax, defining variables, installing missing software, restarting device, etc. In embodiments, the diagnosis and resolution models 132 may apply a weight to the features based on feedback supporting an effect that the one or more features have on the diagnosis and resolution of a technical issue. In the example embodiment, the diagnosis and resolution assessor 134 may generate the diagnosis and resolution models 132 using machine learning methods, such as neural networks, deep learning, hierarchical learning, Gaussian Mixture modelling, Hidden Markov modelling, and K-Means, K-Medoids, or Fuzzy C-Means learning, etc. The diagnosis and resolution models 132 are described in greater detail with reference to FIG. 2.

The diagnosis and resolution assessor 134 may be a software and/or hardware program capable of collecting training data including one or more technical issue tickets, and training one or more diagnosis and resolution models 132 based thereon. Moreover, the diagnosis and resolution assessor 134 may be capable of receiving a configuration of the diagnosis and resolution system 100. In addition, the diagnosis and resolution assessor 134 may be further configured to collect a ticket and data of a current technical issue, compare the ticket of the current technical issue with one or more past technical issue tickets of the training data for a match, determining a resolution, and suggest one or more actions to a support agent. The diagnosis and resolution assessor 134 may be optionally further configured for implementing the determined resolution and adjusting the diagnosis and resolution models 132 based on received feedback. The diagnosis and resolution assessor 134 is described in greater detail with reference to FIG. 2.

Figure 2:
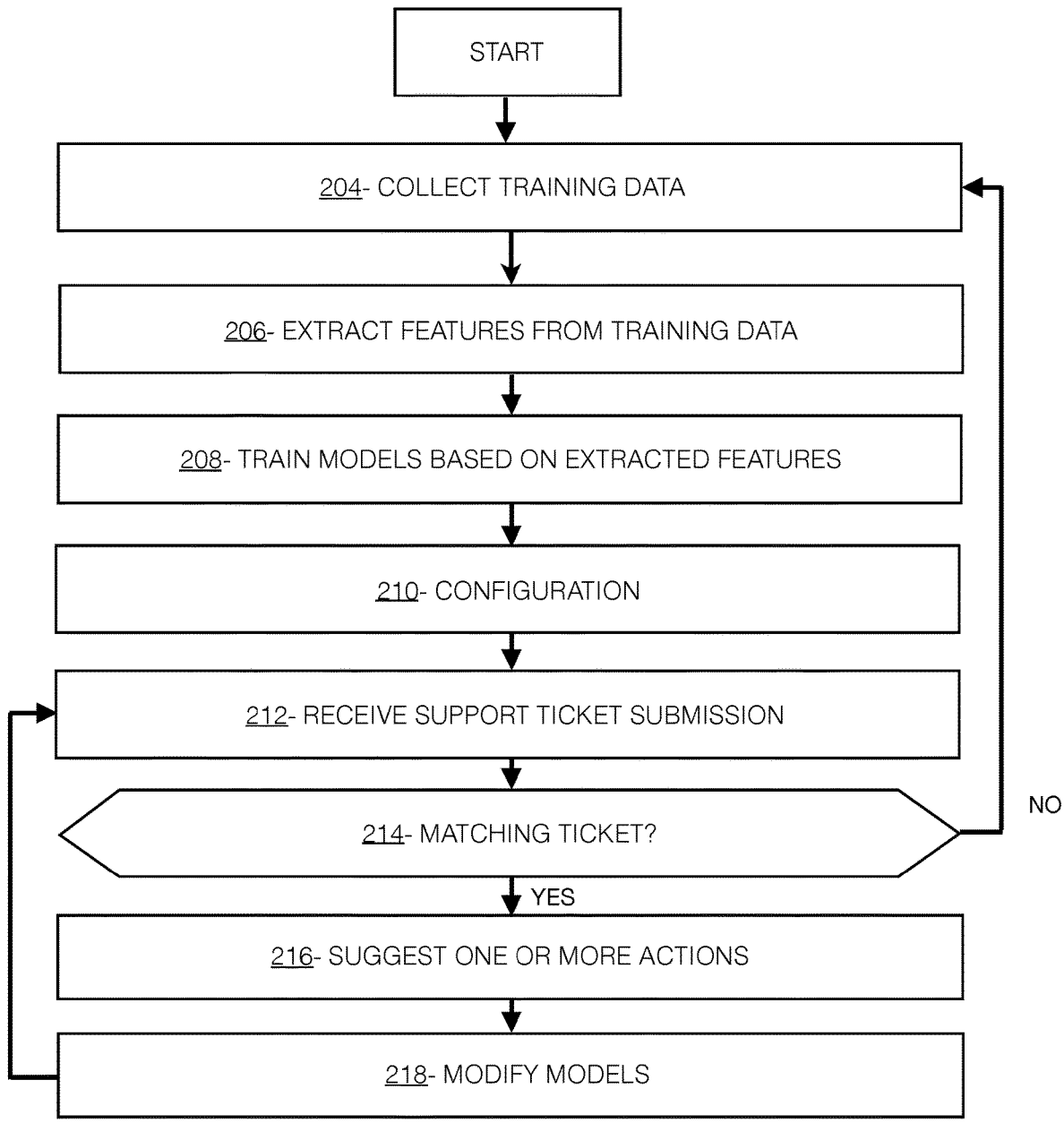
FIG. 2 depicts an exemplary flowchart illustrating the operations of a diagnosis and resolution assessor 134 of the diagnosis and resolution system 100 in diagnosing and resolving technical issues, in accordance with the exemplary embodiments.

FIG. 2 depicts an exemplary flowchart illustrating the operations of a diagnosis and resolution assessor 134 of the diagnosis and resolution system 100 in diagnosing and resolving a technical issue, in accordance with the exemplary embodiments. In exemplary embodiments, the diagnosis and resolution assessor 134 first implements a training phase in which it trains the diagnosis and resolution models 132 using training data from previously conducted technical support interactions between a support agent using the support agent smart device 120 and a user having technical issues using the technically troubled device 110 for various support ticket submissions (technical issues). The diagnosis and resolution assessor 134 then moves on to an operational phase in which it applies the trained diagnosis and resolution models 132 to current support ticket submissions in order to aid support agents in diagnosing and resolving technical support issues of the technically troubled device 110.

The diagnosis and resolution assessor 134 may collect and/or receive training data (step 204). In embodiments, the training data may be sourced from one or more previous troubleshooting interactions between a support agent using the support agent smart device 120 and a user of a technically troubled device 110, and therefore may include data from various support ticket submissions (technical issues). Initially, the training data may include a ticket submitted by a user of the technically troubled device 110 that describes the troubleshooting issue, a topic of the troubleshooting issue, actions taken by the user, error codes, etc. The training data relating to the ticket may be used to classify and organize the one or more diagnosis and resolution models 132 such that each support ticket type/topic/etc. has a corresponding model for resolving the support ticket. The training data may be further collected during or received from the troubleshooting session, and include actions taken by the support agent. Such support agent actions may include the support agent requesting data/files or clarification from the user of the technically troubled device 110, for example the support agent requesting specific log files from the user. The support agent actions may further include using an instrumented log viewer such as a log and trace tool to perform analyses, such as identifying errors, dropping bookmarks on interesting parts of the log file, searching documentation/knowledge bases/databases, annotations, highlighting, mouse scrolling, etc. The diagnosis and resolution assessor 134 captures and records these support agent actions within the instrumented analysis tooling and correlates them with actions in the support ticket system, for example when requesting additional log files or clarifying information from the user. In addition, the support agent actions may further be collected by the one or more sensors 124, implemented as, for example, a video camera, microphone, etc. monitoring a support agent and/or user's facial expression and speech. Lastly, the diagnoses and resolution assessor 134 captures the event that the support ticket is closed and correlates the training data described above for machine learning of the diagnosis and resolution models 132, described in greater detail forthcoming.

To further illustrate the operations of the diagnosis and resolution assessor 134, reference is now made to an illustrative example where the diagnosis and resolution assessor 134 collects training data of previously resolved technical diagnosis and resolution sessions. The collected training data includes technical support tickets, support agent and user searches, annotations, highlighting, mouse scrolling, etc., as well as support agent and user facial expression and speech while diagnosing and resolving the past technical issues.

The diagnosis and resolution assessor 134 may extract one or more features from the collected training data (step 206). Such features may be extracted using techniques such as feature extraction, natural language processing, optical character recognition, pattern/template matching, data comparison, etc., and may be extracted from the log and trace data, the sensors 124, and one or more databases utilized by the support agent. The extracted features may include resources used by the support agent (e.g., support agent requests for files or databases), analyses performed by the support agent using the instrumented log viewer application to identify errors in log files, bookmarks dropped by the support agent on interesting parts of the log file, actions taken by the support agent for each bookmark (e.g., searching documentation and knowledge bases, etc.), etc. The one or more features may additionally include features relating to user/support agent interaction and context such as textual input, searches, annotations, highlighting, scrolling, mouse and keyboard selections, context, etc. In embodiments, the diagnosis and resolution assessor 134 may extract support agent context features such as searches, annotations, highlighting, mouse scrolling, etc. from data of a log and trace viewer or sensors 124. For example, if a support agent highlights and annotates a portion of a trace file with "This is the issue," searches for a term, and asks the user for a specific log file, the diagnosis and resolution assessor 134 may extract the highlight, annotation, term search, and specific log file request as context that may be indicative of a diagnosis. In embodiments, the diagnosis and resolution assessor 134 may additionally extract support agent context features from one or more sensors 124, for example a video camera of a support agent smart device 120 that records footage of a support agent's face while reviewing a log file to diagnose a technical issue. For example, if the diagnosis and resolution assessor 134 collects footage of a support agent smirking upon reading a section of a log file, the diagnosis and resolution assessor 134 may extract context, or a highlight and/or annotation of the log file based on the collected footage, and may treat it as if the support agent had highlighted and annotated the portion of the log file in a log and trace viewer with, "This doesn't seem right."

With reference to the previously introduced example where the diagnosis and resolution assessor 134 collects training data, the diagnosis and resolution assessor 134 extracts features such as bookmarks, textual input, searches, annotations, highlighting, scrolling, mouse and keyboard selections, and context features from the collected training data with respect to each particular ticket submission.

The diagnosis and resolution assessor 134 may train one or more diagnosis and resolution models 132 for each ticket submission based on the extracted features (step 208). In embodiments, the diagnosis and resolution assessor 134 may train a model of the diagnosis and resolution models 132 for each technical support ticket, or type thereof, within the training data and do so based on an association between the one or more features extracted for that support ticket and a corresponding diagnosis and/or resolution. For example, the diagnosis and resolution assessor 134 may generate one model for an inactive server ticket and another model for a missing software ticket, each having different extracted features. In embodiments, the diagnosis and resolution assessor 134 may associate a diagnosis and/or resolution with the model based on the resolution identified in the closed submission ticket of the training data. For example, a closed ticket submission may indicate that a support agent diagnosed a misspelling of a word, and the diagnosis and resolution assessor 134 may associate the misspelling with features such as the support agent's use of a spellcheck tool. In another example, a support agent may diagnose a missing software program, and the diagnosis and resolution assessor 134 may associate the missing software program diagnosis with a support agent's searching of installed programs on the technically troubled device 110. Moreover, a missing source code diagnosis may be associated with a support agent's code failing to compile, and additionally a support agent's scrolling through logs to find the missing source code. An unresponsive software program may be associated with a support agent repeatedly attempting to interact with a software program via clicking, scrolling, etc. and saying, "It's frozen." In embodiments, the diagnosis and resolution assessor 134 may train the one or more diagnosis and resolution models 132 to weight the features such that features shown to have a greater correlation with a troubleshooting step towards a correct diagnosis and/or resolution are weighted greater than those features that are not. Based on the diagnosis and resolution models 132's extracted features and weights associated with such extracted features, the diagnosis and resolution assessor 134 may later compute one or more diagnosis score for each possible diagnosis.

With reference again to the previously introduced example where the diagnosis and resolution assessor 134 extracts bookmarks, textual input, searches, annotations, highlighting, scrolling, mouse and keyboard selections, and context features from the collected training data, the diagnosis and resolution assessor 134 trains a diagnosis and resolution model 132 for each type of previously collected technical issue ticket based on associations of the features with diagnoses that include misspelling, incorrect syntax, undefined variable, missing source code, missing software program, unresponsive software program, and unresponsive device.

The diagnosis and resolution assessor 134 may receive a configuration (step 210). The diagnosis and resolution assessor 134 may be configured by receiving information such as a support agent registration and support agent preferences. The support agent registration and support agent preferences may be uploaded by a support agent or administrator, i.e., the owner of the support agent smart device 120 or the administrator of support agent smart device 120. For example, the administrator may be an owner/support agent of the support agent smart device 120, an employer of a computer-provided or phone-provided employee, etc. In embodiments, the support agent or administrator of support agent smart device 120 may troubleshoot a user's technically troubled device 110. In the example embodiment, the configuration may be received by the diagnosis and resolution assessor 134 via the diagnosis and resolution client 122 and the network 108. Receiving the support agent registration may involve receiving information such as a name, phone number, email address, account credentials (i.e., telephone account, video-chat/web conference, etc.), company name, serial number, support agent smart device 120 type, technically troubled device 110 type, one or more types of the sensors 124, log and trace viewer type, and the like.

During configuration, the diagnosis and resolution assessor 134 may further receive support agent preferences (step 210 continued). Support agent preferences may include the manner in which the diagnosis and resolution assessor 134 should notify the support agent of a diagnosis and resolution. Support agent preferences may additionally include preferences as to which identified resolutions may be automatically implemented without support agent input. For example, the diagnosis and resolution assessor 134 may be configured to automatically apply spell check when application of the diagnosis and resolution models 132 indicates that a spellcheck may resolve a misspelling.

With reference again to the previously introduced example where the diagnosis and resolution assessor 134 trains a diagnosis and resolution model 132 for each type of previously collected technical issue ticket, a support agent uploads a support agent registration indicating that their laptop is to be used as support agent smart device 120 for communication, and configures the sensors 124 as a log and trace viewer and a laptop video camera integrated into the laptop. The support agent preferences also specify that notification of both diagnosis and resolution are to be communicated to the support agent via audio and video feedback on the support agent's laptop.

The diagnosis and resolution assessor 134 may receive a support ticket submission (step 212). In embodiments, the diagnosis and resolution assessor 134 may receive a support ticket indicating that a user is having a technical issue with the technically troubled device 110. As previously discussed, a technical issue ticket may be submitted by a user of the technically troubled device 110 that describes the troubleshooting issue, a topic of the troubleshooting issue, actions taken by the user, error codes, etc.

With reference again to the previously introduced example where the diagnosis and resolution assessor 134 receives a configuration, the diagnosis and resolution assessor 134 receives a technical support issue ticket from the user saying, "unresponsive software."

The diagnosis and resolution assessor 134 may determine if collected technical issue data includes a ticket that matches a ticket of a technical issue previously collected for training purposes above (decision 214). In the example embodiment, the diagnosis and resolution assessor 134 utilizes the categorization of the support tickets in order to determine whether the currently received support ticket matches a ticket for which a model of the diagnosis and resolution models 132 has been generated. In other embodiments, the diagnosis and resolution assessor 134 may utilize natural language processing, classification techniques, topic modelling, etc., to determine if a technical issue ticket matches a previously collected technical issue ticket during step 204. In such embodiments, the diagnosis and resolution assessor 134 may utilize distance metrics to determine a similarity between tickets and, based on having a similarity that exceeds a particular threshold, utilize an associated model.

With reference again to the previously introduced example where the diagnosis and resolution assessor 134 collects a technical issue ticket saying, "unresponsive software," the diagnosis and resolution assessor 134 compares the current technical issue ticket to a category of a technical issue ticket previously collected during training.

If the diagnosis and resolution assessor 134 determines that the current technical issue ticket matches a technical issue ticket previously collected during training (decision 214, "YES" branch), the diagnosis and resolution assessor 134 suggests one or more support agent actions based on the diagnosis and resolution models 132 (step 216). In embodiments, the diagnosis and resolution assessor 134 may recommend actions described in the model based on a weight associated with such support agent actions and an associated diagnosis/resolution. Such actions may include asking the user for certain log files, searching for terms, reading helpful articles, etc.

With reference to the previously introduced example, if the diagnosis and resolution assessor 134 determines that the current technical issue ticket saying "unresponsive software" matches a technical issue ticket previously collected during training, the diagnosis and resolution assessor 134 suggests to the support agent via audio and video notification the actions of requesting log files for the unresponsive software from the user and reading a helpful article on resolving issues with unresponsive software.

If the diagnosis and resolution assessor 134 determines that the current technical issue ticket does no match a technical issue ticket previously collected during training (decision 214, "NO" branch), the diagnosis and resolution assessor 134 may treat the current technical issue as a new technical issue requiring training, and may proceed to collect training data (step 204).

The diagnosis and resolution assessor 134 may evaluate and modify the diagnosis and resolution models 132 (step 218). In the example embodiment, the diagnosis and resolution assessor 134 may verify whether the one or more diagnoses were properly identified in order to provide a feedback loop for modifying the diagnosis and resolution models 132. In embodiments, the feedback loop may simply provide a means for a support agent and/or user to indicate whether they approve of a diagnosis and/or resolution, whether diagnoses were correctly identified, and/or whether the resolutions resolved the technical issues. The feedback loop indication may be triggered via a toggle switch, button, slider, etc. that may be selected by the support agent and/or user manually by hand using a button/touchscreen/etc., by voice, by eye movement, and the like. Based on the diagnosis and resolution assessor 134 properly or improperly identifying a diagnosis, the diagnosis and resolution assessor 134 may modify the diagnosis and resolution models 132. In embodiments, the diagnosis and resolution assessor 134 may modify the diagnosis and resolution models 132 in a manner similar to training models in step 208. The diagnosis and resolution assessor 134 may additionally consider data of a current session, along with feedback from a support agent and/or user, as training data for a future session. In embodiments, the diagnosis and resolution assessor 134 may infer or deduce whether the diagnoses were correctly identified. For example, if a misspelling was identified but the support agent scrolled to the identified misspelling and did not alter the spelling of the misspelled text, the models may deduce that the diagnosis was incorrect. In some embodiments, the diagnosis and resolution assessor 134 may interpret support agent dialogue via natural language processing to determine whether the diagnoses and/or resolutions were properly determined. For example, if the support agent says, "That doesn't help" or other expressions indicative of an incorrect diagnosis and/or resolution, the diagnosis and resolution assessor 134 may infer that the diagnoses and/or resolutions were incorrectly determined and modify the diagnosis and resolution models 132 accordingly. In some embodiments, the diagnosis and resolution assessor 134 may treat a support agent's dismissing of every suggested diagnosis and/or resolution as an indication that the current technical issue is not similar to one or more technical issues analyzed during training, and may proceed to step 204 and/or treat the current technical issue as training data of a new technical issue ticket type. In some embodiments, the diagnosis and resolution assessor 134 may notify the user of a diagnosis and/or resolution upon a support agent's affirming of a diagnosis and/or resolution. Based on feedback received in the above or any other manners, the diagnosis and resolution assessor 134 may then modify the diagnosis and resolution models 132 to more accurately determine diagnoses and resolutions.

With reference to the previously introduced example where the diagnosis and resolution assessor 134 suggests actions to the support agent, the support agent says, "That worked, thanks!" and the support agent notifies the user of the correct diagnosis and resolution. The diagnosis and resolution assessor 134 additionally modifies the diagnosis and resolution models 132 accordingly.

Figure 3:
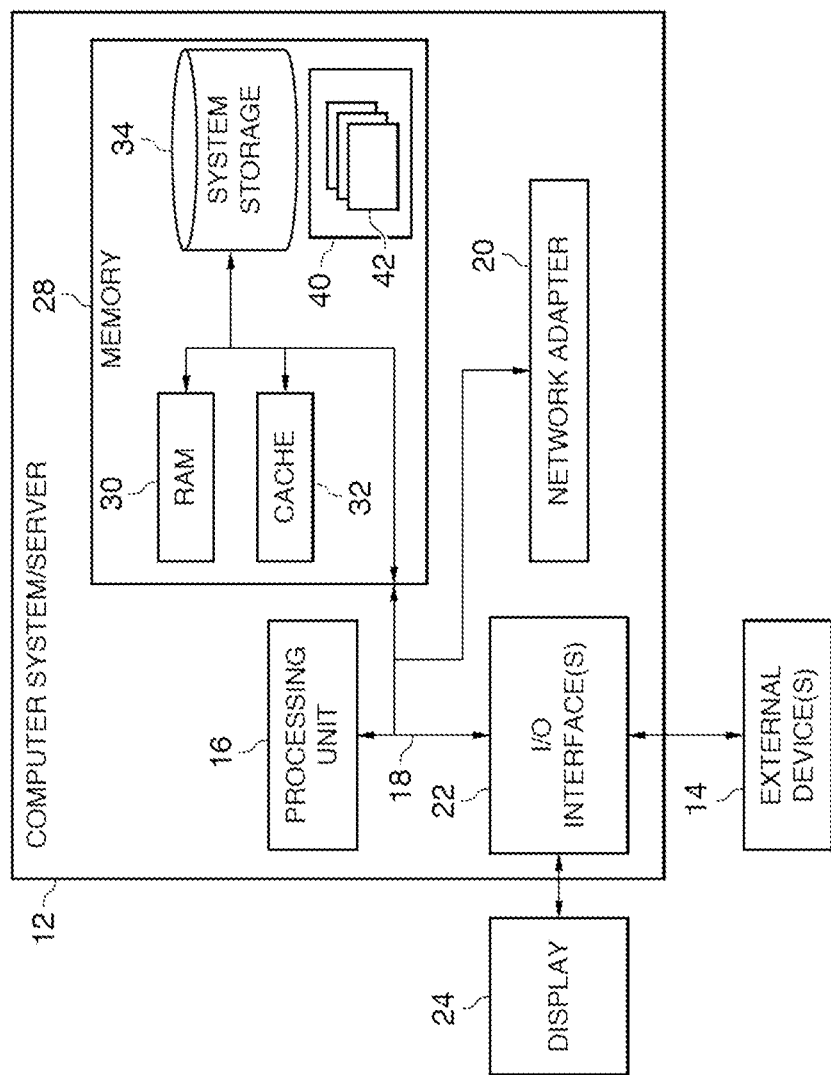
FIG. 3 depicts an exemplary block diagram depicting the hardware components of the diagnosis and resolution system 100 of FIG. 1, in accordance with the exemplary embodiments.

FIG. 3 depicts a block diagram of devices within the diagnosis and resolution assessor 134 of the diagnosis and resolution system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
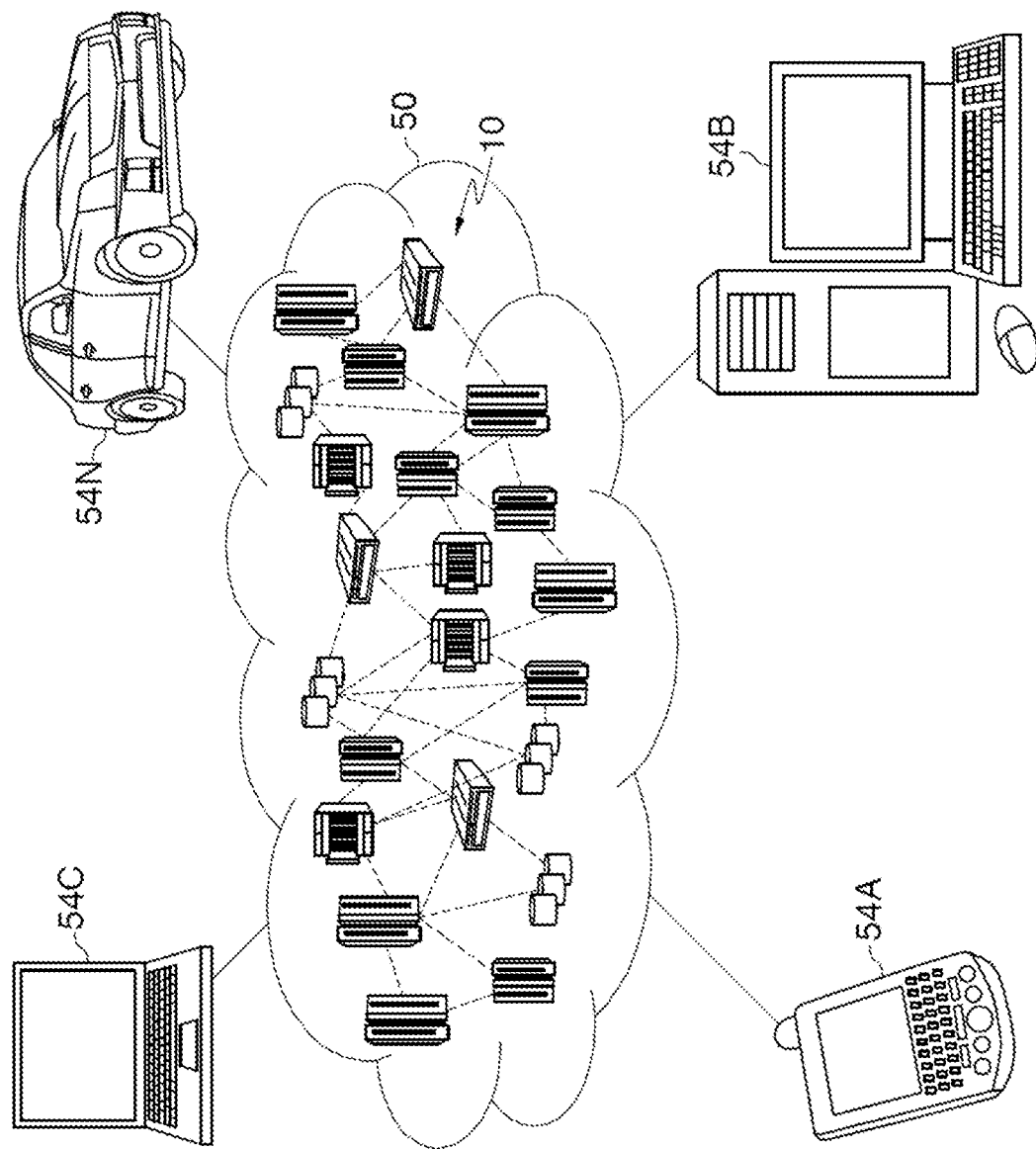
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
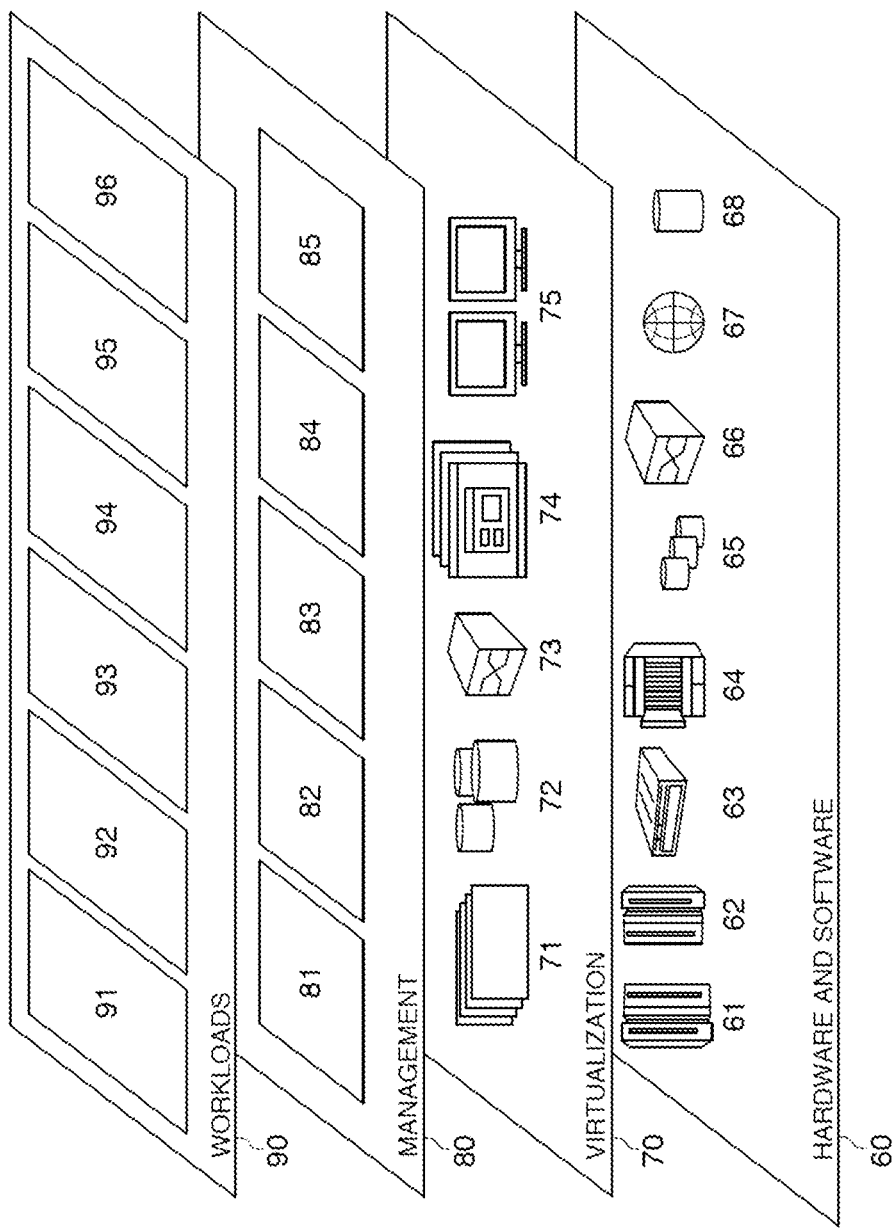
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Resolution Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and technical issue diagnosis 96.

The present invention may be a system, a method, and/or a computer program product at any possible technical detail level of integration. The computer program product may include a computer readable storage medium (or media) having computer readable program resolutions thereon for causing a processor to carry out aspects of the present invention.

The computer readable storage medium can be a tangible device that can retain and store resolutions for use by an resolution execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having resolutions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program resolutions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program resolutions from the network and forwards the computer readable program resolutions for storage in a computer readable storage medium within the respective computing/processing device.

Computer readable program resolutions for carrying out operations of the present invention may be assembler resolutions, resolution-set-architecture (ISA) resolutions, machine resolutions, machine dependent resolutions, microcode, firmware resolutions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program resolutions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program resolutions by utilizing state information of the computer readable program resolutions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program resolutions.

These computer readable program resolutions may be provided to a processor of a computer, or other programmable data processing apparatus to produce a machine, such that the resolutions, which execute via the processor of the computer or other programmable data processing apparatus, create means for implementing the functions/acts specified in the flowchart and/or block diagram block or blocks. These computer readable program resolutions may also be stored in a computer readable storage medium that can direct a computer, a programmable data processing apparatus, and/or other devices to function in a particular manner, such that the computer readable storage medium having resolutions stored therein comprises an article of manufacture including resolutions which implement aspects of the function/act specified in the flowchart and/or block diagram block or blocks.

The computer readable program resolutions may also be loaded onto a computer, other programmable data processing apparatus, or other device to cause a series of operational steps to be performed on the computer, other programmable apparatus or other device to produce a computer implemented process, such that the resolutions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of resolutions, which comprises one or more executable resolutions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer resolutions.

What is claimed is:

1. A computer-implemented method for diagnosing technical issues, the method comprising:
   receiving communication from a user about one or more technical current issues received on a user device;
   collecting data relating to one or more technical issues;
   extracting one or more features from the collected data;
   obtaining previously reported issues and their correlated resolutions; wherein said previous issues are determined to be similar to said user's current technical issues by using said collected data and extracted features;
   creating one or more models using collected data, extracted features and previously reported issues and correlated resolutions, wherein said models are created by a machine learning engine having a feedback loop to improve such models;
   using one or more diagnoses based on previous user issues and correlated resolutions as determined by the extracted one or more features and the one or more models; and
   suggesting to a support agent one or more actions based on the one or more determined diagnoses.

2. The method of claim 1, further comprising:
   determining one or more resolutions of the one or more technical issues based on the one or more extracted features and the one or more models;
   notifying the support agent of the one or more resolutions; and
   resolving the one or more technical issues.

3. The method of claim 1, further comprising:
   receiving feedback indicative of whether the determined one or more diagnoses were accurate or whether the one or more resolutions resolved the technical issue; and
   adjusting the one or more models based on the received feedback.

4. The method of claim 1, wherein the machine learning engine uses data from at least one or more sensors, data from one or more computer logs and trace files, the Internet one or more databases, or one or more log and trace viewer tools, to provide at least one model.

5. The method of claim 1, wherein the collected data includes a technical issue ticket and data relating to the support agent's interaction with log and trace data, further comprising:
   collecting labeled training data relating to one or more past resolved technical issues;
   extracting one or more training features from the collected labeled training data; and
   training one or more models based on the extracted one or more training features, wherein the training features include data that at least includes one of a technical support ticket, support agent and user searches, annotations, highlighting, mouse scrolling, and support agent and user facial expression and speech while diagnosing and resolving the past technical issues.

6. The method of claim 4, wherein at least one model is continuously improved using a feedback loop and at least said same or another model is trained for each possible type of the technical issue ticket.

7. The method of claim 1, wherein the one or more features include bookmarks, textual inputs, searches, annotations, highlighting, scrolling, mouse and keyboard selections, and context.

8. A computer program product for diagnosing technical issues, the computer program product comprising:
   one or more non-transitory computer-readable storage media and program instructions stored on the one or more non-transitory computer-readable storage media capable of performing a method, the method comprising:
      receiving communication from a user about one or more technical current issues received on a user device;
      collecting data relating to one or more technical issues;
      extracting one or more features from the collected data;
      obtaining previously reported issues and their correlated resolutions; wherein said previous issues are determined to be similar to said user's current technical issues by using said collected data and extracted features;
      creating one or more models using collected data, extracted features and previously reported issues and correlated resolutions, wherein said models are created by a machine learning engine having a feedback loop to improve such models;
      using one or more diagnoses based on previous user issues and correlated resolutions as determined by the extracted one or more features and the one or more models; and
      suggesting to a support agent one or more actions based on the one or more determined diagnoses.

9. The computer program product of claim 8, further comprising:
   determining one or more resolutions of the one or more technical issues based on the one or more extracted features and the one or more models;
   notifying the support agent of the one or more resolutions; and
   resolving the one or more technical issues.

10. The computer program product of claim 8, further comprising:
    receiving feedback indicative of whether the determined one or more diagnoses were accurate or whether the one or more resolutions resolved the technical issue; and
    adjusting the one or more models based on the received feedback.

11. The computer program product of claim 8, wherein the machine learning engine uses data from at least one or more sensors, data from one or more computer logs and trace files, the Internet, one or more databases, or one or more log and trace viewer tools, to provide at least one model.

12. The computer program product of claim 8, wherein the collected data includes a technical issue ticket and data relating to the support agent's interaction with log and trace data further comprising:
    collecting labeled training data relating to one or more past resolved technical issues;
    extracting one or more training features from the collected labeled training data; and
training one or more models based on the extracted one or more training features, wherein the training features include data that at least includes one of a technical support ticket, support agent and user searches, annotations, highlighting, mouse scrolling, and support agent and user facial expression and speech while diagnosing and resolving the past technical issues.

13. The computer program product of claim 11, wherein at least one model is continuously improved using a feedback loop and at least said same or another model is trained for each possible type of the technical issue ticket.

14. The computer program product of claim 8, wherein the one or more features include bookmarks, textual inputs, searches, annotations, highlighting, scrolling, mouse and keyboard selections, and context.

15. A computer system for diagnosing technical issues, the computer system comprising:
one or more computer processors, one or more computer-readable storage media, and program instructions stored on the one or more of the computer-readable storage media for execution by at least one of the one or more processors capable of performing a method, the method comprising:
receiving communication from a user about one or more technical current issues received on a user device;
collecting data relating to one or more technical issues;
extracting one or more features from the collected data;
obtaining previously reported issues and their correlated resolutions; wherein said previous issues are determined to be similar to said user's current technical issues by using said collected data and extracted features;
creating one or more models using collected data, extracted features and previously reported issues and correlated resolutions, wherein said models are created by a machine learning engine having a feedback loop to improve such models;
using one or more diagnoses based on previous user issues and correlated resolutions as determined by the extracted one or more features and one or more models; and
suggesting to a support agent one or more actions based on the one or more determined diagnoses.

16. The computer system of claim 15, further comprising:
determining one or more resolutions of the one or more technical issues based on the one or more extracted features and the one or more models;
notifying the support agent of the one or more resolutions; and
resolving the one or more technical issues.

17. The computer system of claim 15, further comprising:
receiving feedback indicative of whether the determined one or more diagnoses were accurate or whether the one or more resolutions resolved the technical issue; and
adjusting the one or more models based on the received feedback.

18. The computer system of claim 15, wherein the machine learning engine uses data from at least one or more sensors, data from one or more computer logs and trace files, the Internet, one or more databases, or one or more log and trace viewer tools, to provide at least one model.

19. The computer system of claim 15, wherein the collected data includes a technical issue ticket and data relating to the support agent's interaction with log and trace data further comprising:
collecting labeled training data relating to one or more past resolved technical issues;
extracting one or more training features from the collected labeled training data; and
training one or more models based on the extracted one or more training features, wherein the training features include data that at least includes one of a technical support ticket, support agent and user searches, annotations, highlighting, mouse scrolling, and support agent and user facial expression and speech while diagnosing and resolving the past technical issues.

20. The computer system of claim 19, wherein at least one model is continuously improved using a feedback loop and at least said same or another model is trained for each possible type of the technical issue ticket.

* * * * *